United States Patent [19]

Burgdorf et al.

[11] Patent Number: 4,840,436

[45] Date of Patent: Jun. 20, 1989

[54] ANTI-LOCK BRAKE SYSTEM WITH TRACTION SLIP CONTROL

[75] Inventors: Jochen Burgdorf, Rumpenheim; Hans-Dieter Reinartz, Frankfurt am Main; Lutz Weise, Pfungstadt; Norbert Ocvirk, Offenbach; Horst P. Becker, Frankfurt am Main; Otto Determann, Darmstadt, all of Fed. Rep. of Germany

[73] Assignee: Alfred Teves GmbH, Frankfurt am Main, Fed. Rep. of Germany

[21] Appl. No.: 112,310

[22] Filed: Oct. 22, 1987

[30] Foreign Application Priority Data

Oct. 22, 1986 [DE] Fed. Rep. of Germany ....... 3635846

[51] Int. Cl.$^4$ .......................... B60T 8/32; B60K 28/16
[52] U.S. Cl. ..................................... 303/119; 303/110; 303/113; 303/116
[58] Field of Search ............... 303/119, 114, 116, 113, 303/110, 10, 52

[56] References Cited

U.S. PATENT DOCUMENTS

| | | | |
|---|---|---|---|
| 4,578,951 | 4/1986 | Belart et al. | 303/6 C |
| 4,685,747 | 8/1987 | Belart et al. | 303/114 |
| 4,715,663 | 12/1987 | Hattori et al. | 303/116 |
| 4,728,156 | 3/1988 | Burgdorf et al. | 303/119 |

FOREIGN PATENT DOCUMENTS

| | | |
|---|---|---|
| 2952221 | 7/1981 | Fed. Rep. of Germany . |
| 3040561 | 5/1982 | Fed. Rep. of Germany . |
| 3327401 | 2/1985 | Fed. Rep. of Germany . |
| 3407539 | 9/1985 | Fed. Rep. of Germany . |
| 3418042 | 11/1985 | Fed. Rep. of Germany ...... 303/119 |
| 3438401 | 4/1986 | Fed. Rep. of Germany . |
| 3542419 | 10/1986 | Fed. Rep. of Germany . |
| 2083581 | 3/1982 | United Kingdom ............... 303/119 |
| 2149035 | 6/1985 | United Kingdom . |
| 2155129 | 9/1985 | United Kingdom ............... 303/114 |
| 2155131 | 9/1985 | United Kingdom . |
| 2170287 | 7/1986 | United Kingdom . |
| 2173559 | 10/1986 | United Kingdom . |

Primary Examiner—Andres Kashnikow
Assistant Examiner—Mark T. Le
Attorney, Agent, or Firm—James B. Raden

[57] ABSTRACT

An anti-lock brake system with traction slip control includes a pedal-actuated, auxiliary-force-assisted braking pressure generator having a master cylinder to which the wheel brakes are connected by main brake lines, auxiliary-pressure hydraulic pumps, wheel sensors and electronic circuits for determining the wheel rotational behavior and for generating electric braking-pressure control signals which, for the purpose of brake slip control, serve to control electromagnetically actuatable pressure-fluid inlet valves and outlet valves provided in the pressure-fluid lines. Pistons of the master cylinder include central control valves which, in the brake's release position, open pressure-fluid connections between the pressure-fluid supply reservoir and the pressure chambers and which, in the braking position, close the pressure-fluid connections. The brake lines communicate through supply lines with the pumps. Valves are provided in the pressure-fluid lines connecting the master cylinder to the pressure-fluid supply reservoir and prevent return flow of the pressure fluid out of the pressure chambers of the master cylinder when traction slip control is performed.

9 Claims, 3 Drawing Sheets

ANTI-LOCK BRAKE SYSTEM WITH TRACTION SLIP CONTROL

BACKGROUND OF THE INVENTION

The present invention relates to an anti-lock brake system having traction slip control which includes a pedal-actuated, preferably auxiliary-force-assisted braking pressure generator having a master cylinder, to which the wheel brakes are connected by way of main brake lines, auxiliary-pressure hydraulic pumps, and wheel sensors and electronic circuits for determining the wheel rotational behavior and for generating electric braking-pressure control signals which, for the purpose of slip control, serve to control electromagnetically actuatable pressure-fluid inlet valves and outlet valves provided in the pressure-fluid lines. The pistons of the master cylinder are provided with central control valves which, in the brake's release position, open pressure-fluid connections between the pressure-fluid supply reservoir and the pressure chambers and which, in the braking position, close these pressure-fluid connections. The electric motor driven pumps are connected to the supply reservoir, on the one hand, and to the main brake lines, on the other hand.

In known brake systems of this type such as U.S. Pat. No. 4,415,210 (German published patent application No. 30 40 561) and U.S. Pat. No. 4,416,491 (German published patent application No. 30 40 562), a master cylinder having a hydraulic brake power booster connected upstream thereof is used as a braking pressure generator. The auxiliary-pressure supply system includes a hydraulic pump and a hydraulic accumulator from which auxiliary pressure proportional to pedal force is delivered on brake application with the aid of a control valve. On the one hand, this dynamic pressure is transmitted by way of the master cylinder into the static brake circuits connected to the master cylinder. On the other hand, the wheel brakes of one axle, preferably those of the rear axle, are in direct communication with the pressure chamber of the booster into which the pressure proportional to pedal force is introduced through the control valve. For the purpose of slip control, inlet valves are provided in both the static circuits and the dynamic circuit, which valves normally assume their opened position and which, in the event of an imminent locked condition of a wheel, serve to shut off the pressure-fluid flow to the wheel brake effected.

There are also provided outlet valves which allow pressure fluid to discharge from the effected wheel brake to the pressure-compensating reservoir. On commencement of slip control, the booster chamber into which the controlled pressure from the auxiliary-pressure supply system is introduced is connected by way of a main valve with the static brake circuits of the master cylinder in order to replenish the quantity of pressure fluid which is removed from the static circuit through the outlet valves. In addition, for safety reasons, the piston of the master cylinder, or pistons in the case of a tandem master cylinder are reset or fixed by means of a positioning device. The structural complexity required for generating, storing and controlling the hydraulic auxiliary pressure, for dynamic fluid delivery into the static circuits and for safeguarding the brake functions on failure of individual circuits is considerable.

In brake systems of this type, the control signals for the inlet valves and outlet valves are generated by means of electronic circuits, the inputs of which are connected to wheel sensors, for example inductive pickups, for measuring wheel rotational data, and which are able to react to changes in the wheel rotational behavior indicative of an imminent locked condition. The control signals operate to maintain the pressure at the wheel concerned constant, by reducing and increasing the pressure as required.

SUMMARY OF THE INVENTION

It is the object of the present invention to provide a brake system such that relatively few valves are penetrated by pressure fluid in the event of brake application and also in the event of brake pressure control. Furthermore, it is an object of the invention to provide for traction slip control action by means of a minimum number of additional valves. A further object of the invention is to provide for use of this system on a vehicle having diagonal brake-circuit allotment as well as on a vehicle with all-wheel drive.

These objects are achieved according to the present invention in that a valve is provided in the pressure-fluid conduit leading from the pressure-fluid supply reservoir to the master cylinder which will shut off the pressure-fluid passage in the event of traction control, thereby enabling development of auxiliary pressure in the brake circuit.

BRIEF DESCRIPTION OF THE DRAWING

The invention will be better understood after reading the following Detailed Description of the Preferred Embodiment in conjunction with the drawing in which.

DETAILED DESCRIPTION OF THE PREFERRED EMBODIMENT

Figure 1:
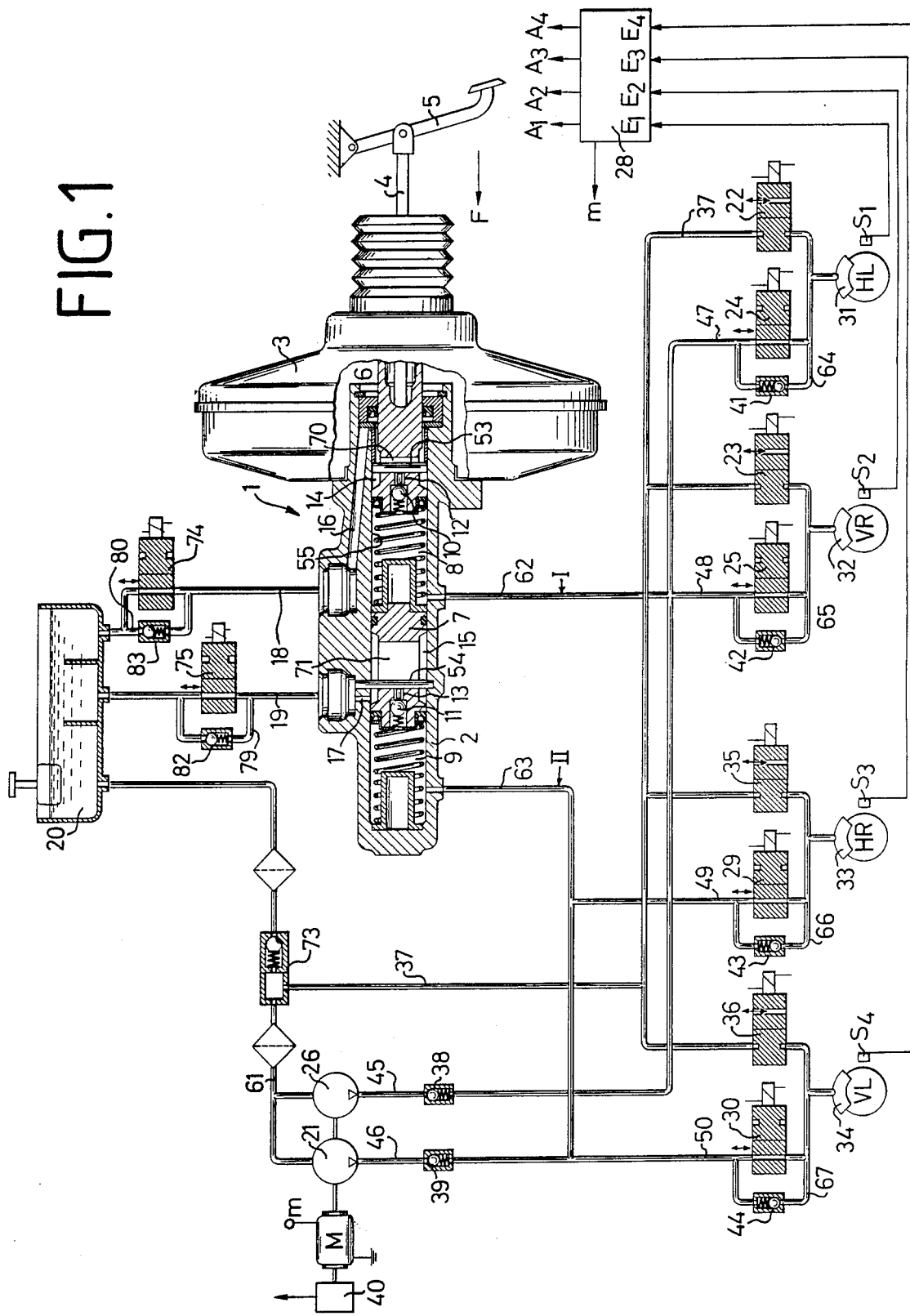
FIG. 1 is a partial cross section and schematic representation of one embodiment of the brake system according to the invention.

In the embodiment illustrated in FIG. 1, the inventive brake system includes a braking pressure generator 1, a hydraulic unit which includes a tandem master cylinder 2 and a vacuum booster 3 connected upstream thereof. Pedal force F applied on a brake pedal 5 is transmitted by a push rod 4 in a known fashion onto the vacuum booster 3, which force is boosted by auxiliary force, and applied to working pistons 6 and 7 of the tandem master cylinder 2.

In the shown released position of the brake, the pressure chambers 8, 9 of the master cylinder 2 are in communication with a pressure-compensating and pressure-fluid supply reservoir 20 by way of normally open central control valves 10, 11, connecting channels 12, 13 in the interior of the pistons 6, 7, annular chambers 14, 15, connecting bores 16, 17 and hydraulic lines 18, 19. Shut-off valves 74, 75, which are normally opened in their de-energized state, are provided in the hydraulic lines 18, 19.

The two brake circuits I, II connected to the master cylinder 2 communicate with the wheel brakes 31, 32, 33, 34 by way of electromagnetically actuatable normally open when de-energized inlet valves 24, 25 and 29, 30, respectively. In both front and rear drive applications the wheel brakes 31, 32 and 33, 34, respectively, are located at diagonal locations on the vehicle with each pair 31, 32 and 33, 34 being hydraulically connected in parallel.

The wheel brakes 31, 32, 33, 34 are further connected to normally closed when de-energized electromagnetically actuatable outlet valves 22, 23 and 35, 36, respectively. The outlet valves are in communication with the pressure-compensating reservoir 20 through a hydraulic return line 37, and, also communicate with the suction sides of the pumps 21, 26, by way of a suction line 61. The pumps are hydraulic pumps driven by an electric motor M. The motor is electrically connected to a source at the electrical connection m and is grounded to the vehicle. There is also provided an electrically operating function-monitoring device, shown in block diagram as monitoring circuit 40, which functions to monitor the mode of operation of the motor M.

The vehicle wheels are equipped with inductive sensors $S_1$, $S_2$, $S_3$, $S_4$ which cooperate with a toothed disc rotating synchronously to the wheel rotation and generate electric signals indicative of the wheel rotational behavior, such as the wheel speed and variations thereof. These signals are fed by way of the inputs $E_1$, $E_2$, $E_3$, $E_4$ to an electronic signal-processing and combining circuitry 28 which generates braking-pressure control signals serving to temporarily switch over the inlet and outlet valves 22, 23, 24, 25, 29, 30, 35, 36 on detection of an imminent locked condition and to thereby keep the braking pressure constant by decreasing and increasing the pressure at the appropriate time. Accordingly, the actuating magnets of the inlet and outlet valves are driven by the outputs $A_1$, $A_2$, $A_3$, $A_4$. The electric connection lines between the ports $A_1$, $A_2$, $A_3$, $A_4$ and the coils of the valves 22, 23, 24, 25, 29, 30, 35, 36 are not illustrated for the sake of simplicity.

The circuitry 28 can be provided in a known fashion by hard-wired circuits or by programmed electronic units, such as microcomputers or microcontrollers.

The signal for starting the drive motor M of the hydraulic pumps 21, 26 which must run during a slip control action is applied to the motor M through the connection m.

The brake system operates as follows:

On brake application, the pedal force F, boosted by the vacuum in the booster 3, is transmitted onto the master cylinder pistons 6, 7. The central control valves 10, 11 close, thus allowing braking pressure to develop in the pressure chambers 8, 9 and hence in the brake circuits I, II which then propagates by way of the valves 24, 25 and 29, 30, respectively, to the wheel brakes 31, 32 and 33, 34, respectively.

On detection of an imminent locked condition at one or more of the wheels by means of the sensors $S_1$, $S_2$, $S_3$, $S_4$ and the circuitry 28, slip control will commence. The drive motor M of the pumps 21, 26 will be switched on, whereby pressure develops in the two supply lines 45, 46 which is applied on the wheel cylinders of the wheel brakes 31, 32, 33, 34 by way of the non-return valves 38, 39, the branch lines 47, 48 and 49, 50, respectively, and the inlet valves 25, 26 and 29, 30, respectively. The pressure also acts upon the pressure chambers 8, 9 of the master cylinder 2.

A signal from the circuitry 28 results in change-over of the electromagnetically actuatable inlet valves 24, 25 and 29, 30, respectively, and thus causes closure of the brake circuits I, II and the branch lines 47, 48, 49, 50, respectively. Further displacement of the master cylinder pistons 6, 7 in the direction of the pedal force F as well as emptying of the pressure chambers 8, 9 is precluded. The pressure fluid from the pumps 21, 26 flows by way of the supply lines 45, 46, the opened non-return valves 38, 39 and the main brake lines 62, 63 into the pressure chambers 8, 9 and urges the pistons 6, 7 back to their initial positions. The actual braking pressure variation in the wheel brakes 31, 32, 33, 34 is determined by the inlet and outlet valves 29, 30, 35, 36, which are operated by slip-controlling braking-pressure control signals over the lines $A_1$, $A_2$, $A_3$, $A_4$.

As can be seen from the drawing, the inlet valves 24, 25 and 29, 30, respectively, are protected by parallel connected non-return valves 41, 42 and 43, 44, respectively. In special cases, the non-return valves 41, 42, 43, 44 permit a termination of the braking pressure control and release of the wheel brakes, respectively, since a small quantity of pressure fluid can flow back from the wheel brakes 31, 32, 33, 34 into the pressure chambers 8, 9, with the inlet valves 24, 25 and/or 29, 30 and the outlet valves 22, 23 and/or 35, 36 closed, provided that the piston 6, 7 of the master cylinder 2 have been returned to their initial position and the central control valves 10, 11 are in their opened condition.

The central control valves 10, 11 each include a tappet which is slidably accommodated in a longitudinal bore of the piston 6 and 7, respectively, and whose one end abuts on a stationary stops 53 and 54, respectively, which extend transversely through the piston bore 55 of the master cylinder 2 and which lift the valve balls from their valve seats in the release position. The valve balls 10, 11 are held in a cage which encloses a rubber cushion or a plug of any elastic material and which can be displaced in opposition to the force of a closure spring. In the position of the valve shown, the pressure fluid can flow out of the pressure chambers 8 and 9, respectively, through the annular gap between valve ball 10 and the valve seat, through the connecting channel 12 and 13 and the recess 70 and 71, respectively, into the annular chamber 14 and 15, respectively, and from there through the channel 16 and 17, respectively, back into the pressure-fluid supply reservoir 20. As soon as the pistons 6, 7 are displaced by the pedal force F from their illustrated position in the direction of the arrow, the valve balls will take seat on the valve seats and thereby close the longitudinal bores. Depending on the magnitude of the pedal force F, the central control valves 10, 11 may adopt a breathering position, with the pistons 6, 7 lifting at least partially from the cross members or stops 53, 54.

The brake system described hereinabove is adapted for use on an all-wheel driven vehicle having two brake circuits with diagonal brake-circuit allotment. Upon the occurrence of an incipient traction slip, the motors 21, 26 will be switched on by means of the signal-processing circuit 28, wherein pressure fluid is fed into the supply lines 45, 46, into the brake lines 62, 63 and thus into the pressure chambers 8, 9 of the master cylinder 2, from where the pressure fluid can propagate through the central control valves 10, 11 and the lines 18, 19 into the reservoir 20. If, for example during acceleration any one of the vehicle wheels begins to spin, the relevant shut-off valve 74 or 75 is switched to close by an electric signal produced by the signal-processing circuit 28. After the hydraulic line 18 or 19 has been closed, the full pump pressure may now build up in the relevant brake circuit I or II, since the pressure fluid delivered by the respective pump 21 or 26 cannot discharge into the reservoir 20. If it is assumed, for example, that the vehicle wheel VL (left front wheel) is in the traction slip range, the assigned wheel brake 34 can be braked by virtue of the opened inlet valve 30. Simultaneously, the inlet valve 29 must be switched to close, the outlet valve 36 must be switched to close and the outlet valve 35 to open.

Figure 2:
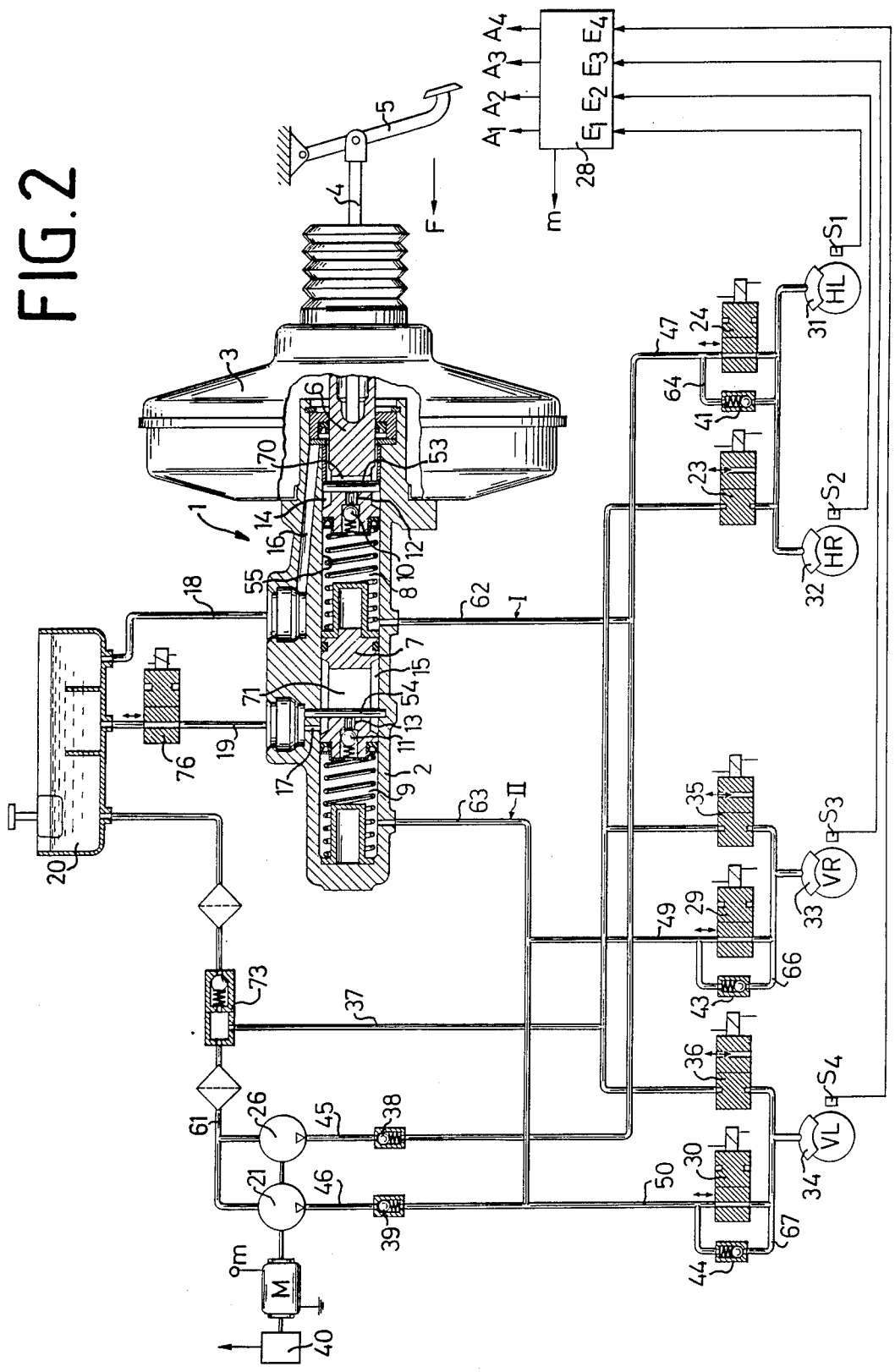
FIG. 2 is a partial cross section and schematic representation showing details of an alternative embodiment of a brake system according to the invention.

The embodiment of the brake system according to FIG. 2 is a system for use on a vehicle with front-wheel drive and front-axle/rear-axle brake-circuit allotment. In this brake system, only one shut-off valve 76 is interposed into the hydraulic line 19 which connects the pressure chamber 9 of the brake circuit II with the supply reservoir 20. If, for instance, the left front vehicle wheel moves into the slip range, braking pressure can be built up in the main brake line 63 after the valve 76 has closed. Closure of the valves 36 and 29 allows the corresponding wheel brake 34 to be actuated.

Figure 3:
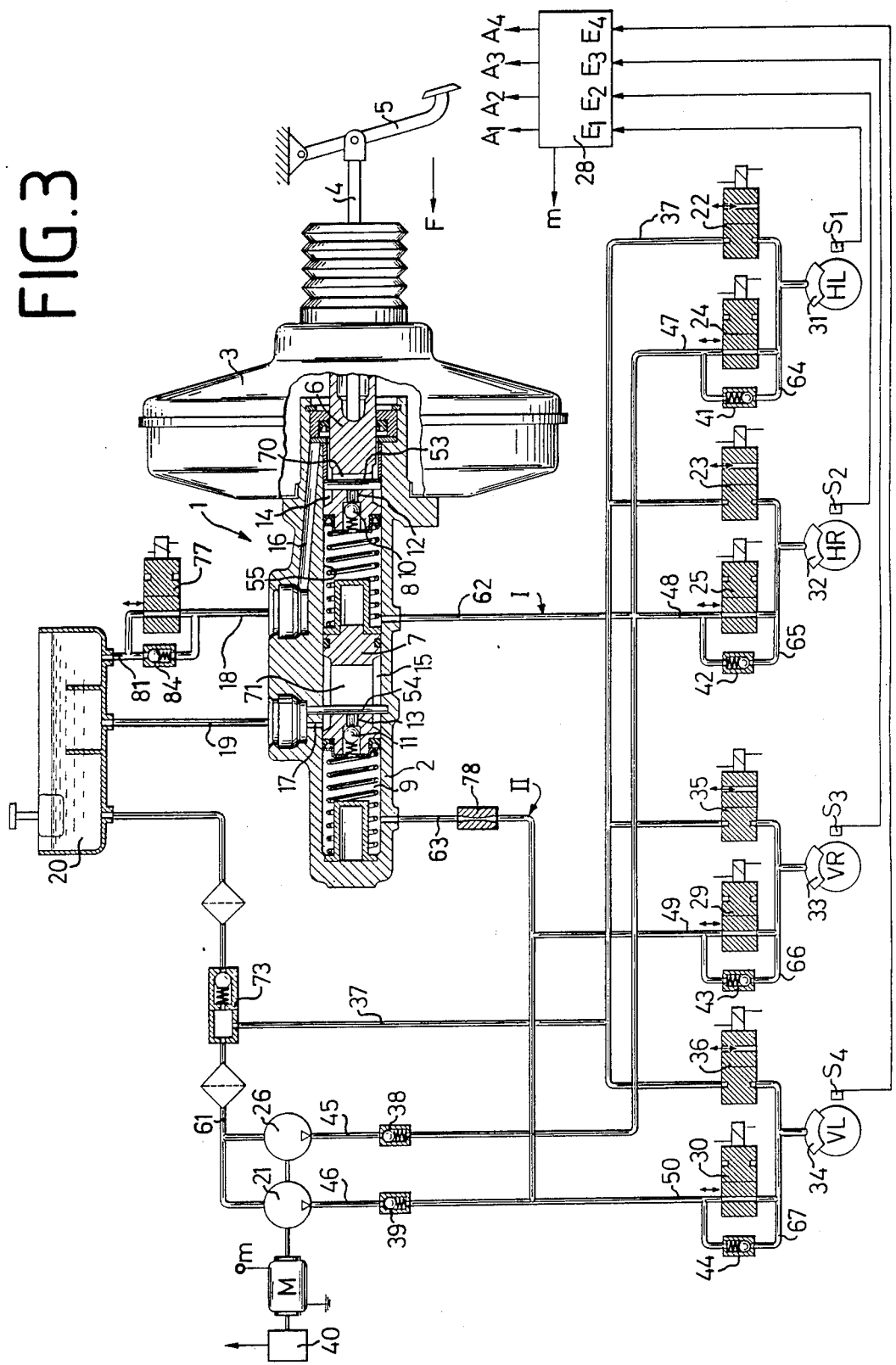
FIG. 3 is a partial cross section and schematic representation showing details of another alternative embodiment of a brake system according to the invention.

A special feature of the brake system illustrated in FIG. 2 compared to those shown in FIGS. 1 and 3 is that the two wheel brakes (HR and HL) of the rear axle 31 and 32 are controlled jointly and hence share one joint inlet valve 24 and one joint outlet valve 23. This joint control of the wheel brakes 31, 32 does not change anything in respect of the invention's basic principle of effecting traction slip control with the aid of a shut-off valve 76 inserted in the pressure-fluid conduit 19 between pressure-fluid supply reservoir 20 and master cylinder 2.

FIG. 3 shows a brake system for a vehicle with rear-wheel drive and front-axle/rear-axle brake-circuit allotment. The principle characteristic of this system is that, on the one hand, one of the brakes 31, 32 of the rear axle can be blocked for the purpose of traction slip control (in the brake circuit I) by switching the shut-off valve 77 to its closed position and by switching-on the pumps 21, 26, while on the other hand, the piston 7 of the tandem brake master cylinder is retained in its initial position, since the throttle 78 provided in the main brake line 63 prevents an initial discharge of pressure fluid from the pressure chamber 9 into the line system 63, 49, 50.

What is claimed is:

1. An anti-lock brake system with traction slip control of the type including a pedal-actuated, auxiliary-force-assisted braking pressure generator having a master cylinder to which two brake circuits each including a pair of wheel brakes are connected by two main brake lines, at least one auxiliary-pressure hydraulic pump, wheel sensor means and electronic circuit means for determining rotational behavior of the wheels and for generating electric braking-pressure control signals which, for the purpose of slip control, control an electromagnetically actuatable pressure-fluid inlet valve and outlet valve provided in the pressure-fluid lines, pistons of the master cylinder being provided with central control valves which, in a brake release position, open pressure-fluid connections between a pressure-fluid supply reservoir and pressure chambers of the master cylinder and which, in a braking position, close said pressure-fluid connections, said at least one hydraulic pump connected to the supply reservoir and to the main brake lines, and comprising at least one valve provided in a pressure-fluid conduit leading from the pressure-fluid supply reservoir to the master cylinder, said at least one valve adapted to shut off pressure-fluid flow in said conduit in the event of traction control, whereby auxiliary pressure develops in said two brake circuits.

2. The brake system as claimed in claim 1 wherein each of said two brake circuits includes a separate hydraulic pump and a hydraulic pressure line connecting each pump directly to one of said pressure chambers of the master cylinder.

3. The brake system as claimed in claim 1 including bypass lines in each main brake line, bypassing each inlet valve, and a non-return valve provided in each bypass line, each said non-return valve adapted to permit return flow of pressure fluid from each wheel brake into the respective main brake line.

4. The brake system as claimed in claim 1 wherein each central control valve in each piston of the master cylinder includes a valve member longitudinally slidable in a recess in said piston, said valve member cooperating with a tappet such that the tappet moves the valve member into an opened position when the piston is in the release position, said tappet taking support on a stationary stop.

5. The brake system as claimed in claim 4 wherein each said valve member of each said central control valves is acted upon by a spring in a closing direction, said valve member cooperating with a valve seat arranged in the piston of the master cylinder and having a longitudinal bore in the piston extending from said valve seat.

6. The brake system as claimed in claim 5 including a transverse pressure-fluid passage in said piston intersecting the longitudinal bore in the piston.

7. The brake system as claimed in claim 4 wherein said stop member is stationarily supported in a wall of the master cylinder and extends through a recess in the piston.

8. The brake system as claimed in claim 1 including at least one branch line bypassing at least one valve and at least one non-return valve in said at least one branch line.

9. An anti-lock brake system with traction slip control of the type including a pedal-actuated, auxiliary-force-assisted braking pressure generator having a master cylinder to which two brake circuits each including a pair of wheel brakes are connected by two main brake lines, at least one auxiliary-pressure hydraulic pump, wheel sensor means and electronic circuit means for determining rotational behavior of the wheels and for generating electric braking-pressure control signals which, for the purpose of slip control, control an electromagnetically actuatable pressure-fluid inlet valve and outlet valve provided in the pressure-fluid lines, pistons of the master cylinder being provided with central control valve which in a brake release position, open pressure-fluid connections between a pressure-fluid supply reservoir and pressure chambers of the master cylinder and which, in a braking position, close said pressure-fluid connections, said at least one hydraulic pump connected to the supply reservoir and to the main brake lines, and comprising at least one valve provided in a pressure-fluid conduit leading from the pressure-fluid supply reservoir to the master cylinder, said at least one valve adapted to shut off pressure-fluid flow in said conduit in the event of traction control, whereby auxiliary pressure develops in said two brake circuits, including a throttling valve in one of the main brake lines which is connected to one of said pressure chambers of the master cylinder which includes a floating piston, said throttling valve adapted to preclude displacement of said floating piston in an actuating direction during traction control.

* * * * *